United States Patent [19]

Ueno et al.

[11] 4,315,086

[45] Feb. 9, 1982

[54] RESIN COMPOSITIONS

[75] Inventors: Katsuji Ueno, Hirakata; Takashi Maruyama, Toyonaka, both of Japan

[73] Assignee: Sumitomo Chemical Company, Limited, Osaka, Japan

[21] Appl. No.: 169,368

[22] Filed: Jul. 16, 1980

[30] Foreign Application Priority Data

Aug. 8, 1979 [JP] Japan .................................. 54-101682
Sep. 26, 1979 [JP] Japan .................................. 54-124574

[51] Int. Cl.$^3$ ...................... C08F 283/08; C08L 71/04
[52] U.S. Cl. ............................. 525/391; 260/18 EP; 260/18 PN; 260/18 R; 525/392; 525/396; 525/397; 525/930
[58] Field of Search ................. 525/391, 392, 396, 397

[56] References Cited

U.S. PATENT DOCUMENTS

| | | | |
|---|---|---|---|
| 3,356,761 | 12/1967 | Fox ........................................ | 525/392 |
| 3,379,792 | 4/1968 | Finbolt ............................ | 260/857 R |
| 3,475,513 | 10/1969 | Benson ................................ | 525/396 |
| 3,651,012 | 3/1972 | Holub .................................. | 525/391 |
| 3,700,630 | 10/1972 | Hamada ............................. | 525/391 |
| 3,738,969 | 6/1973 | Holub .................................. | 525/397 |

*Primary Examiner*—Paul Lieberman
*Attorney, Agent, or Firm*—Stevens, Davis, Miller & Mosher

[57] ABSTRACT

A resin composition comprising a resin composition comprising 5 to 95% by weight of a polyphenylene oxide and 95 to 5% by weight of a polyamide and 0.01 to 30 parts by weight of a member selected from the group consisting of (A) liquid diene polymers, (B) epoxy compounds and (C) compounds having in the molecule both of (a) an ethylenic carbon-carbon double bond or a carbon-carbon triple bond and (b) a carboxylic acid, acid anhydride, acid amide, imido, carboxylic acid ester, amino or hydroxyl group per 100 parts by weight of the total of the polyphenylene oxide and polyamide.

12 Claims, No Drawings

RESIN COMPOSITIONS

The present invention relates to resin compositions comprising polyphenylene oxide, polyamide and a compound having a specified structure.

A polyphenylene oxide is a resin having excellent thermal, mechanical and electrical properties, and commercially it is blended with a polystyrene and put on the market as Noryl resin by General Electric Company. But, polyphenylene oxide and its modified product, Noryl resin, have a drawback in that they are poor in solvent resistance, and therefore their use for certain usages is limited at present irrespective of their excellent other characteristics. The improvement of the drawback is therefore strongly desired.

For the resons as described above, the inventors extensively studied to develop a polyphenylene oxide having an improved solvent resistance without doing a great damage to the characteristics of the resin. As a result, it was found that such a resin can be obtained by melt-blending a polyphenylene oxide and a polyamide in a specified mixed ratio. The resin composition thus obtained shows no phase separation on processing and has excellent solvent resistance, but it is a little poor in impact resistance in certain usages. As a result of a further study to improve this drawback, the inventors found that the melt-blended product of a mixture of polyphenylene oxide, polyamide and a compound having a specified structure is superior in mechanical properties such as impact resistance to the aforesaid melt-blended product of a simple mixture of polyphenylene oxide and polyamide.

The reason why the resin composition obtained according to the present invention is superior in mechanical strength to the melt-blended product of a simple mixture of polyphenylene oxide and polyamide, is not clear. From the electron microscopic observation of both resin compositions, however, it is presumed that graft reaction has probably taken place between polyphenylene oxide and polyamide in the case of the resin composition of the present invention. This is because it is observed that both the polyphenylene oxide region and the polyamide region of the present resin composition are in a markedly fine disperse state as compared with the simple mixture.

For the purpose of imparting impact resistance to a resin, a method of blending the resin and a rubbery polymer is frequently employed in general. But, a composition comprising polyphenylene oxide, polyamide and a rubbery polymer showed a low impact resistance. The inventors found, however, that the impact resistance of the composition can be improved by adding a compound having a specified structure. The inventors thus attained the present invention.

An object of the present invention is to provide a polyphenylene oxide/polyamide composition superior not only in solvent resistance but also in impact resistance. Other objects and advantages of the present invention will become apparent from the following description.

According to the present invention, there is provided a resin composition comprising a resin composition comprising 5 to 95% by weight of polyphenylene oxide and 95 to 5% by weight of polyamide and 0.01 to 30 parts by weight of a member selected from the group consisting of (A) liquid diene polymers, (B) epoxy compounds and (C) compounds having in the molecule both of (a) an ethylenic carbon-carbon double bond or a carbon-carbon triple bond and (b) a carboxylic acid, acid anhydride, acid amide, imido, carboxylic ester, amino or hydroxyl group per 100 parts by weight of the total of polyphenylene oxide and polyamide.

The present invention will be illustrated in more detail.

As polyphenylene oxide used in the present invention, the well-known ones may satisfactorily be used. It can easily be produced by the methods disclosed in U.S. Pat. Nos. 3,306,875, 3,337,501 and 3,787,361. For example, it can be obtained by oxidation-polymerizing a phenol compound of the formula,

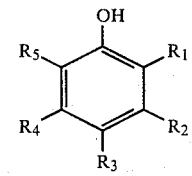

wherein $R_1$, $R_2$, $R_3$, $R_4$ and $R_5$ are each a hydrogen, halogen atom, a hydrocarbon or substituted hydrocarbon group and one of them is a hydrogen atom, with oxygen or an oxygen-containing gas in the presence of an oxidation-coupling catalyst.

As specific examples of $R_1$, $R_2$, $R_3$, $R_4$ and $R_5$ in the above formula, there may be given for example hydrogen, chlorine, fluorine, bromine and iodine atoms, and methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl and ethylphenyl groups.

As specific examples of the phenol compound, there may be given for example phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol and 2,3,5-, 2,3,6- or 2,4,6-trimethylphenol. These phenol compounds may be used as a mixture of them.

Also, phenol compounds other than those represented by the above formula, for example dihydric phenols (e.g. bisphenol A, tetrabromobisphenol A, resorcinol, hydroquinone) may be copolymerized with those represented by the above formula.

The oxidation-coupling catalyst used in the oxidation-polymerization of the phenol compound is not particularly limited, and any of those acting as a catalyst on the polymerization can be used. As typical examples of the catalyst, there may be given for example catalysts comprising a cuprous salt and a tertiary amine (e.g. cuprous chloride-trimethylamine, cuprous acetate-triethylamine, cuprous chloride-pyridine), catalysts comprising cupric salt-tertiary amine and an alkali metal hydroxide (e.g. cupric chloride-pyridine-potassium hydroxide), catalysts comprising a manganese salt and a primary amine (e.g. manganese chloride-ethanolamine, manganese acetate-ethylenediamine), catalysts comprising a manganese salt and alcoholate or phenolate (e.g. manganese chloride-sodium methylate, manganese chloride-sodium phenolate) and catalysts comprising a combination of a cobalt salt and a tertiary amine.

As specific examples of the polyphenylene oxide, there may be given, for example, poly(2,6-dimethyl-1,4-phenylene oxide), poly(2-methyl-1,4-phenylene oxide), poly(3-methyl-1,4-phenylene oxide), poly(2,6-diethyl- 1,4-phenylene oxide), poly(2,6-dipropyl-1,4-phenylene oxide), poly(2-methyl-6-allyl-1,4-phenylene oxide), poly(2,6-dichloromethyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide), and poly(2,5-dimethyl-1,4-phenylene oxide).

Copolymers of the phenol compounds also may be used.

The polyamide used in the present invention is one having a

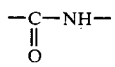

linkage in the main chain, and any of the well-known ones which are fusible by heating can be used. Typical examples of the polyamide include for example 4-nylon, 6-nylon, 6,6-nylon, 12-nylon, 6,10-nylon, polyamides resulting from terephthalic acid and trimethyl hexamethylenediamide, polyamides resulting from adipic acid and meta-xylylenediamine, polyamides resulting from adipic acid, azelaic acid and 2,2-bis-(p-aminocyclohexyl)propane and polyamides resulting from terephthalic acid and 4,4'-diaminodicyclohexylmethane.

The blending ratio of polyphenylene oxide to polyamide is 5 to 95 wt %, preferably 30 to 70 wt %, of the former to 95 to 5 wt %, preferably 70 to 30 wt %, of the latter. When the polyamide is less than 5 wt %, its effect to improve the solvent resistance is small, while when it exceeds 95 wt %, thermal properties such as heat distortion temperature tend to become poor.

As the liquid diene polymer used in the present invention, there may be given for example homopolymers of a conjugated diene and copolymers of the conjugated diene and at least one member selected from the group consisting of other conjugated dienes, olefins, aromatic vinyl compounds and acetylenic compounds, having a number average molecular weight of 150 to 10,000, preferably 150 to 5,000. These homopolymers and copolymers can be produced, for example, by the well-known methods in U.S. Pat. Nos. 4,054,612, 3,876,721 and 3,428,699.

As specific examples of the homopolymers of a conjugated diene and copolymers of fellow conjugated dienes, there may be given for example homopolymers of butadiene, isoprene, 1,3-pentadiene, cyclopentadiene, 2,3-dimethylbutadiene, chloroprene or 2-phenylbutadiene, and copolymers of these fellow conjugated dienes.

Copolymers of a conjugated diene and an olefin include for example copolymers comprising the foregoing conjugated diene and at least one member selected from olefins consisting of ethylene, propylene, butene-1, isobutylene, pentene-1, hexene-1, heptene-1, octene-1 and dodecene-1.

Copolymers of a conjugated diene and an aromatic vinyl compound include for example styrene/butadiene copolymers, isoprene/styrene copolymers, butadiene/isoprene/styrene copolymers, 1,3-pentadiene/styrene copolymers, butadiene/α-methylstyrene copolymers, isoprene/α-methylstyrene copolymers and butadiene/p-hydroxystyrene copolymers.

Although the micro structure of the double bond of these liquid diene polymers contains a vinyl groups, trans-1,4 structure and cis-1,4 structure in different proportions, all these polymers are included in the scope of the present invention independent of the micro structure.

As the epoxy compound used in the present invention, the well-known ones, for example (1) epoxy resins produced by condensing polyhydric phenols and epichlorohydrin in different proportions, (2) epoxy resins produced by condensing polyhydric alcohols and epichlorohydrin, (3) glycidyletherified products of monohydric phenols or monohydric alcohols, (4) glycidyl derivatives of amine compounds and (5) epoxidized products of higher olefins or cycloalkenes, can be used.

Typical examples of the epoxy resins (1) include for example condensates resulting from bisphenol A and epichlorohydrin (commercial products include for example Sumi-epoxy ELA-115, ELA-127, ELA-128, ELA-134, ESA-011, ESA-014, ESA-017 and ESA-019 produced by Sumitomo Chemical Co.), condensates resulting from resorcinol and epichlorohydrin, condensates resulting from hydroquinone and epichlorohydrin, condensates resulting from tetrabromobisphenol A and epichlorohydrin and the glycidyletherified products of phenol novolak or cresol novolak (commercial products include for example Sumi-epoxy ESCN-220 series products produced by Sumitomo Chemical Co.).

As typical examples of a polyhydric alcohol used for producing the expoxy resin (2), there may be given for example ethylene glycol, propylene glycol, butylene glycol, polyethylene glycol, polypropylene glycol, glycerin, trimethylolethane, trimethylolpropane and pentaerythritol.

The glycidyletherified products (3) include for example phenyl glycidyl ether, butyl glycidyl ether and cresyl glycidyl ether. The glycidyl derivatives of amine compounds (4) are put on the market, for example, under the name of Sumi-epoxy ELN-125 (produced by Sumitomo Chemical Co.) which is a diglycidyl derivative of aniline.

Further, condensates between dihydric phenols and epichlorohydrin having a fairly high molecular weight, for example those put on the market as Phenoxy resin (produced by Union Carbide Corp.), can also be used. Still further, other epoxidized compounds, for example epoxy derivatives of natural unsaturated oils (e.g. soybean oil) and those of the foregoing low molecular weight diene polymers, can be used.

As specific examples of the specified compound having both of (a) an ethylenic carbon-carbon double bond or a carbon-carbon triple bond and (b) a carboxylic acid, acid anhydride, acid amide, imido, carboxylic acid ester, amino or hydroxyl group, there may br given for example maleic anhydride, maleic acid, fumaric acid, maleimide, maleic hydrazide and reaction products resulting from a diamine and maleic anhydride, maleic acid, fumaric acid, maleimide or maleic hydrazide for example compounds of the formulae,

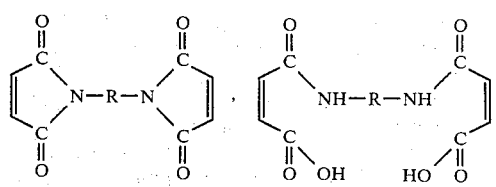

wherein R is an alkylene or arylene group having up to 20 carbon atoms or

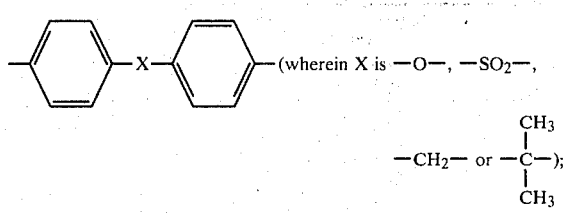

(wherein X is —O—, —SO$_2$—, —CH$_2$— or
$-\overset{\overset{\displaystyle CH_3}{|}}{\underset{\underset{\displaystyle CH_3}{|}}{C}}-$
);

methylnadic anhydride, dichloromaleic anhydride, maleic acid amide and natural fats and oils (e.g. soybean oil, tung oil, castor oil, linseed oil, hempseed oil, cotton seed oil, sesame oil, rapeseed oil, peanut oil, camellia oil, olive oil, coconut oil, sardine oil); unsaturated carboxylic acids (e.g. acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, decosenoic acid, erucic acid, tetracosenoic acid, mycolipenic acid, 2,4-pentadienoic acid, 4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid); esters, acid amides or anhydrides of these unsaturated carboxylic acids; unsaturated alcohols (e.g. allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols of the formulae $C_nH_{2n-5}OH$, $C_nH_{2n-7}OH$, $C_nH_{2n-9}OH$ (wherein n is a positive integer up to 30), 3-butene-1,2-diol, 2,5-dimethyl-3-hexene-2,5-diol, 1,5-hexadiene-3,4-diol, 2,6-octadiene-4,5-diol); unsaturated amines resulting from replacing the —OH group of the above unsaturated alcohols with —NH$_2$ group; and compounds derived from said low molecular weight polymers (average molecular weight, 150 to 10,000, preferably 150 to 5,000) of a diene compound (e.g. butadiene, isoprene) or high molecular weight polymers (average molecular weight, more than 10,000) of the diene compound, for example adducts resulting from the foregoing polymers and maleic anhydride or phenols, and the amino, carboxylic or hydroxyl group-substituted products of the foregoing polymers. It is a matter of course that the compound of a specified structure defined in the present invention includes those having not less than two of the functional groups of the group (a) (which may be the same or different) are not less than two of the functional groups of the group (b) (which may be the same or different) at the same time.

The foregoing compounds (A), (B) and (C) may be used alone or in combination. The total amount of the compounds is 0.01 to 30 parts by weight, preferably 0.1 to 20 parts by weight, more preferably 0.3 to 10 parts by weight, based on 100 parts by weight of a mixture of polyphenylene oxide and polyamide. When the amount is less than 0.01 part by weight, the effect of the present invention tends to be small, while amounts more than 30 parts by weight tend to lower the softening temperature.

In the present invention, it is desirable to add rubbery high molecular weight polymers in order to further elevate the impact strength. The rubbery high molecular weight polymers include natural and synthetic polymer materials showing elasticity at room temperature. As the specific examples of the rubbery polymer, there may be given for example natural rubbers, butadiene polymers, butadiene/styrene copolymers (including random copolymers, block copolymers and graft copolymers), isoprene polymers, chlorobutadiene polymers, butadiene/acrylonitrile copolymers, isobutylene polymers, isobutylene/butadiene copolymers, isobutylene/isoprene copolymers, acrylic ester polymers, ethylene/propylene copolymers, ethylene/propylene/diene copolymers, thiokol rubber, polysulfide rubber, polyurethane rubber, polyether rubber (e.g. polypropylene oxide) and epichlorohydrin rubber.

These rubbery polymers may be produced by any of the well-known methods (e.g. emulsion polymerization, solution polymerization) using any of the well-known catalysts (e.g. peroxides, trialkylaluminum, lithium halides, nickel catalysts). These rubbery polymers may be used independent of the degree of crosslinking, the proportion of the cis structure, trans structure and vinyl group contained in the micro structure and the average particle size.

Any copolymer of random copolymers, block copolymers, graft copolymers and the like may be used as the rubbery polymer. Further, in producing these rubbery polymers, monomers such as other olefins, dienes, aromatic vinyl compounds, acrylic acid, acrylic esters and methacrylic esters may be added as an additional component for copolymerization. And the copolymerization may be carried out by any of random copolymerization, block copolymerization, graft copolymerization and the like. As specific examples of the monomers, there may be given for example ethylene, propylene, styrene, chlorostyrene, α-methylstyrene butadiene, isoprene, chlorobutadiene, butene, isobutylene, methyl acrylate, acrylic acid, ethyl acrylate, butyl acrylate, methyl methacrylate and acrylonitrile. Further, partially modified products of the products of the rubbery polymer of the present invention, for example polybutadiene modified at the end of the chain with a hydroxyl or carboxylic group and partially hydrogenated styrene/butadiene block copolymers, are included in the scope of the present invention.

The amount of the rubbery polymer used is 5 to 100 parts by weight, preferably 5 to 50 parts by weight, based on 100 parts by weight of a mixture of polyphenylene oxide and polyamide. When the amount is less than 5 parts by weight, the effect of the rubbery polymer to improve impact resistance is poor. When the amount is more than 100 parts by weight, the impact resistance is much improved, but amounts of not more than 100 parts by weight are desirable, considering balance between the impact resistance and other physical properties.

The addition of styrene polymer for a further improvement in the processability of resin is one of the desirable embodiments. Specific examples of the styrene polymer include for example styrene homopolymer, copolymers of styrene and other vinyl compounds and rubber-reinforced polystyrene, the so-called high impact polystyrene.

The method for producing the resin compositions of the present invention is not particularly limited, and the conventional methods are satisfactorily employed. Generally, however, melt-blending methods are desirable. The time and temperature required for melt-blending are not particularly limited, and they can properly be determined according to the composition of the material. The temperature somewhat varies with the blending ratio of polyphenylene oxide to polyamide, but generally it is within a range of 150° to 350° C. A prolonged time is desirable for mixing, but the deterioration of the resin composition advances. Consequently, the time needs to be determined taking into account these points.

Any of the melt-blending methods may be used, if it can handle a molten viscous mass. The method may be applied in either of batchwise form or continuous form. Specifically, extruders, Banbury mixers, rollers, kneaders and the like may be exemplified.

Next, the present invention will be illustrated in more detail with reference to the following examples, which are not however to be interpreted as limiting the invention thereto.

EXAMPLES 1 to 5

2,6-Dimethylphenol was dissolved in a mixture of toluene and methanol, and manganese chloride and ethylene diamine were added thereto. Thereafter, oxidation was carried out under an oxygen atmosphere to obtain poly-(2,6-dimethyl-1,4-phenylene oxide) (intrinsic viscosity, 0.55 dl/g in chloroform). The polyphenylene oxide thus obtained, polyamide (nylon 6,6, produced by Toray Co.) and liquid polybutadiene (SUMIKAOIL 150, produced by Sumitomo Chemical Co.; number average molecular weight, about 1,700; cis-1,4 structure more than 75%, vinyl structure less than 2%) were mixed in proportions described in Table 1 and kneaded at 250° to 300° C. for 5 minutes on Brabender Plastograph. The Izod impact values (according to ASTM D-256) of the kneaded products are shown in Table 1.

COMPARATIVE EXAMPLE 1

Operation was carried out in the same manner as in Example 1 except that the liquid polybutadiene is not used. The result was shown in Table 1.

TABLE 1

|  | Polyphenylene oxide nylon 6,6 (weight ratio) | Liquid polybutadiene (PHR*) | Izod impact value (with notch) (kg . cm/cm$^2$) |
|---|---|---|---|
| Example 1 | 7/3 | 1 | 8.6 |
| Example 2 | 6/4 | 3 | 9.3 |
| Example 3 | 5/5 | 1 | 12.1 |
| Example 4 | 4/6 | 0.5 | 11.9 |
| Example 5 | 3/7 | 0.7 | 13.3 |
| Comparative example 1 | 7/3 | 0 | 2.7 |

*PHR : Part by weight per 100 parts by weight of the total of polyphenylene oxide and polyamide.

EXAMPLE 6, COMPARATIVE EXAMPLE 2

Polyphenylene oxide (44 parts by weight), polyamide (44 parts by weight), liquid polybutadiene (1 part by weight), all of which were the same as used in Example 1, and a butadiene/styrene copolymer (12 parts by weight, Solprene 1204, produced by Asahi Kasei Co.) were mixed and kneaded at 280° C. for 5 minutes on Brabender Plastograph. The Izod impact value (according to ASTM D-256) was 16.3 kg.cm/cm$^2$. For comparison (Comparative example 2), the same operation as above was repeated except that liquid polybutadiene was not used. The Izod impact value of the kneaded product was 2.7 kg.cm/cm$^2$.

EXAMPLES 7 TO 14

The same poly-(2,6-dimethyl-1,4-phenylene oxide) and polyamide as used in Example 1 and each of the epoxy compounds in Table 2 were mixed and kneaded at 250° to 300° C. for 5 minutes on Brabender Plastograph. The Izod impact value of the kneaded product was measured according to ASTM D-256 in order to show the mechanical strength, and the heat distortion temperature of the product was measured according to ASTM D-648 in order to show the heat resistance. The results are shown in Table 2.

COMPARATIVE EXAMPLE 3

Operation was carried out in the same manner as in Example 7 except that the epoxy compound was not used. The result is shown in Table 2.

It is apparent from Table 2 that the impact resistance is improved as compared with the comparative example by adding the epoxy compounds according to the present invention.

TABLE 2

|  | Polyphenylene oxide/nylon 6,6 (weight ratio) | Specified compound Kind | Amount (PHR) | Izod impact value (kg . cm/cm$^2$) | HDT (°C.) |
|---|---|---|---|---|---|
| Example 7 | 5/5 | Sumi-epoxy ELA-128 | 1 | 10.3 | 135 |
| Example 8 | 4/6 | Phenoxy resin | 1 | 9.3 | 101 |
| Example 9 | 4/6 | Epoxidized soybean oil | 3 | 9.1 | 97 |
| Example 10 | 3/7 | 2-Ethylhexyl glycidyl ether | 0.5 | 8.3 | 95 |
| Example 11 | 7/3 | Polyethylene glycol diglycidyl ether | 2 | 7.9 | 175 |
| Example 12 | 2/8 | Neopentyl glycol diglycidly ether | 5 | 11.3 | 79 |
| Example 13 | 6/4 | Glycerin diglycidyl ether | 3 | 10.9 | 143 |
| Comparative |  |  |  |  |  |

TABLE 2-continued

| | Polyphenylene oxide/nylon 6,6 (weight ratio) | Specified compound Kind | Amount (PHR) | Izod impact value (kg . cm/cm²) | HDT (°C.) |
|---|---|---|---|---|---|
| Example 3 | 5/5 | None | — | 4.1 | 131 |

(Note) HDT: Heat distortion temperature

EXAMPLES 14 TO 21

The same polyphenylene oxide and polyamide as used in Example 1 and each of the compounds shown in Table 3 were mixed and kneaded at 250° to 300° C. for 5 minutes on Brabender Plastograph. In order to know the degree of improvement in solvent resistance, the kneaded product was extracted with chloroform to separate polyphenylene oxide. Also, the Izod impact value of the kneaded product was measured according to ASTM D-256 in order to know mechanical strength, and the heat distortion temperature (HDT) was measured according to ASTM D-648 in order to know heat resistance. The results are shown in Table 3 together with the result of Comparative example 4 using no specified compound.

It is apparent from Table 3 that the method of the present invention improves the graft percentage, solvent resistance and impact resistance as compared with the comparative example.

TABLE 3

| | Polyphenylene oxide/nylon 6,6 (weight ratio) | Specified compound Kind | Amount (PHR) | Amount of chloroform-extract (wt %) | Izod impact value (with notch) (kg . cm/cm²) | HDT (°C.) |
|---|---|---|---|---|---|---|
| Example 14 | 5/5 | Adduct (I) of liquid polybutadiene and maleic anhydride *1 | 1 | 0 | 10.3 | 142 |
| Example 15 | 7/3 | Adduct (II) of liquid polybutadiene and maleic anhydride *2 | 3 | 0 | 7.5 | 175 |
| Example 16 | 4/6 | Linseed oil | 1 | 0 | 11.1 | 97 |
| Example 17 | 7/3 | Maleic anhydride | 1 | 2.2 | 6.5 | 175 |
| Example 18 | 6/4 | Linoleic acid | 0.7 | 0 | 6.1 | 151 |
| Example 19 | 5/5 | Oleyl alcohol | 3 | 0 | 8.9 | 142 |
| Example 20 | 4/6 | Adduct of liquid polybutadiene and phenol *3 | 1.5 | 0 | 9.2 | 99 |
| Example 21 | 2/8 | Linolenylamine | 0.8 | 0 | 8.3 | 81 |
| Comparative example 4 | 7/3 | None | — | 25 | 2.7 | 174 |

*1 Product obtained by addition of 1,4-polybutadiene (100 parts by weight; average molecular weight, about 8,000) to maleic anhydride (25 parts by weight).
*2 Product obtained by addition of 1,4-polybutadiene (100 parts by weight; average molecular weight, about 300) to maleic anhydride (10 parts by weight).
*3 Product obtained by addition of 1,4-polybutadiene (100 parts by weight; average molecular weight, about 1,700) to phenol (about 50 parts by weight).

What is claimed is:

1. A resin composition comprising a resin composition comprising 5 to 95% by weight of a polyphenylene oxide and 95 to 5% by weight of a polyamide and 0.01 to 30 parts by weight of a member selected from the group consisting of (A) liquid diene polymers, (B) epoxy compounds and (C) compounds having in the molecule both of (a) an ethylenic carbon-carbon double bond or a carbon-carbon triple bond and (b) a carboxylic acid, acid anhydride, acid amide, imido, carboxylic acid ester, amino or hydroxyl group per 100 parts by weight of the total of polyphenylene oxide and polyamide.

2. A resin composition according to claim 1, wherein said polyphenylene oxide is obtained by oxidation-polymerizing a phenol compound of the formula,

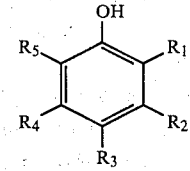

wherein $R_1$, $R_2$, $R_3$, $R_4$ and $R_5$ are each a hydrogen, halogen atom, a hydrocarbon or substituted hydrocarbon group and at least one of them is a hydrogen atom, with oxygen or an oxygen-containing gas in the presence of an oxidation-coupling catalyst.

3. A resin composition according to claim 1, wherein the weight ratio of polyphenylene oxide to polyamide is 30-70/70-30.

4. A resin composition according to claim 1, wherein said liquid diene polymer has a numer average molecular weight of 150 to 10,000.

5. A resin composition according to claim 4, wherein the liquid diene polymer is a member selected from the group consisting of homopolymers of butadiene, isoprene, 1,3-pentadiene, cyclopentadiene, 2,3-dimethylbutadiene, chloroprene or 2-phenylbutadiene, and copolymers of these fellow conjugated dienes, copolymers comprising the foregoing conjugated diene and at least one member selected from olefins consisting of ethylene, propylene, butene-1, isobutylene, pentene-1, hexene-1, heptene-1, octene-1 and dodecene-1, styrene/butadiene copolymers, isoprene/styrene copolymers, butadiene/isoprene/styrene copolymers, 1,3-pentadiene/styrene copolymers, butadiene/α-methylstyrene copolymers, isoprene/α-methylstyrene copolymers and butadiene/p-hydroxystyrene copolymers.

6. A resin composition according to claim 1, wherein said epoxy compounds is (1) epoxy resins produced by condensing polyhydric phenols and epichlorohydrin in different proportions, (2) epoxy resins produced by condensing polyhydric alcohols and epichlorohydrin, (3) glycidyletherified products of monohydric phenols or monohydric alcohols, (4) glycidyl derivatives of amine compounds or (5) epoxidized products of higher olefins or cycloalkenes.

7. A resin composition according to claim 1, wherein said compound (C) is a member selected from the group consisting of maleic anhydride, maleic acid, fumaric acid, maleimide, maleic hydrazide, reaction products of a diamine with maleic anhydride, maleic acid, fumaric acid, maleimide and maleic hydrazide, methylnadic anhydride, dichloromaleic anhydride, maleic acid amide, natural fats and oils, unsaturated carboxylic acid esters, acid amides and anhydrides of unsaturated carboxylic acids, unsaturated alcohols, unsaturated amines, adducts of diene polymer with maleic anhydride and 'phenols, and amino, carboxylic and hydroxyl group-substituted diene polymer.

8. A resin composition according to claim 1, wherein said compound (C) is one represented by the formulae,

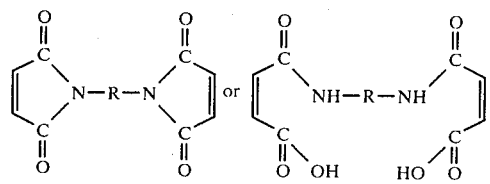

wherein R is an alkylene or arylene group having up to 20 carbon atoms, or

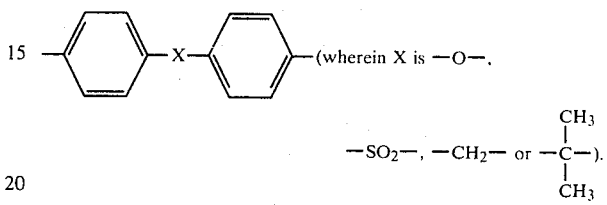

9. A resin composition according to claim 1, wherein the amount of said compound (A), (B) or (C) is 0.1 to 20 parts by weight per 100 parts by weight of the total of polyphenylene oxide and polyamide.

10. A resin composition according to claim 9, wherein the amount of said compound (A), (B) or (C) is 0.3 to 10 parts by weight.

11. A resin composition according to claim 1, wherein a rubbery polymer is added in amount of 5 to 100 parts by weight per 100 parts by weight of the total of polyphenylene oxide and polyamide.

12. A resin composition according to claim 11, wherein the amount is 5 to 50 parts by weight.

* * * * *